Jan. 1, 1952      D. W. GRISWOLD ET AL      2,580,420
APPARATUS FOR PROCESSING FOOD STOCK
Filed May 3, 1947      4 Sheets-Sheet 2
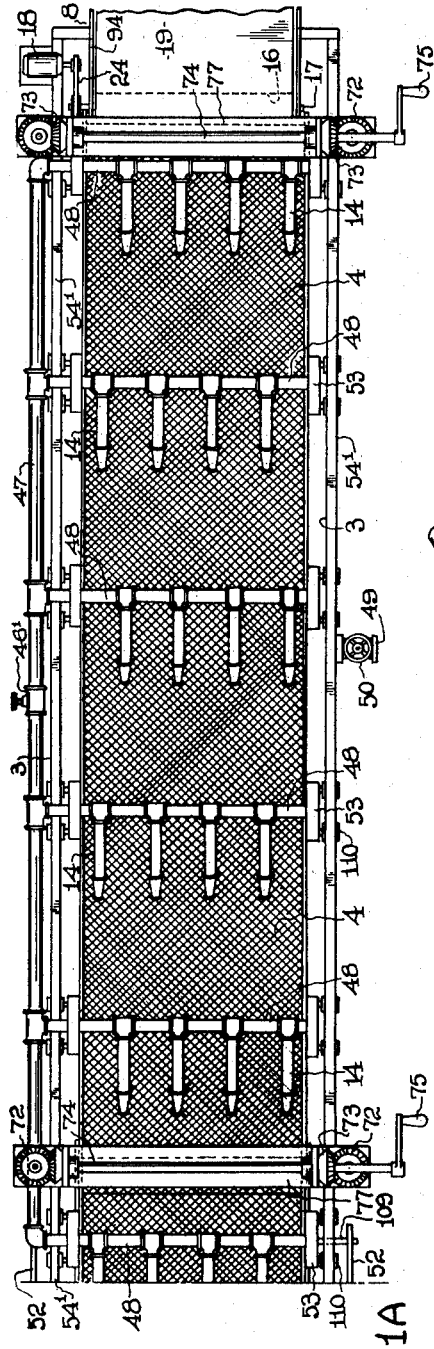
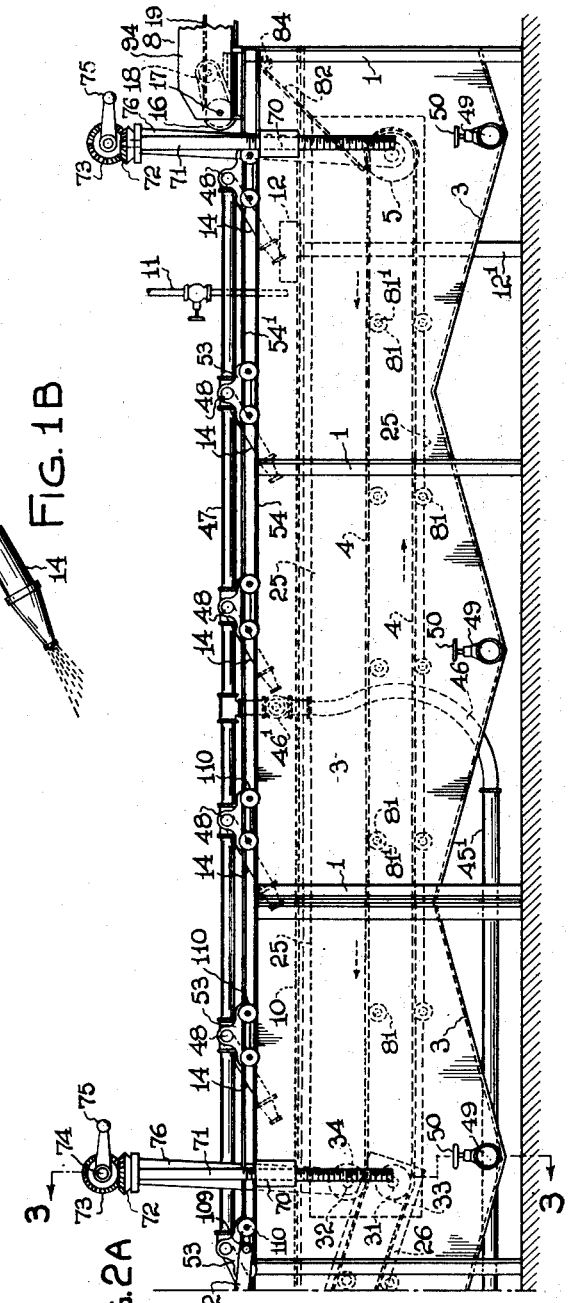
INVENTORS.
DONALD W. GRISWOLD
BY HAROLD N. RICKET
George W. Saywell
ATTORNEY Jan. 1, 1952 D. W. GRISWOLD ET AL 2,580,420
APPARATUS FOR PROCESSING FOOD STOCK
Filed May 3, 1947 4 Sheets-Sheet 3

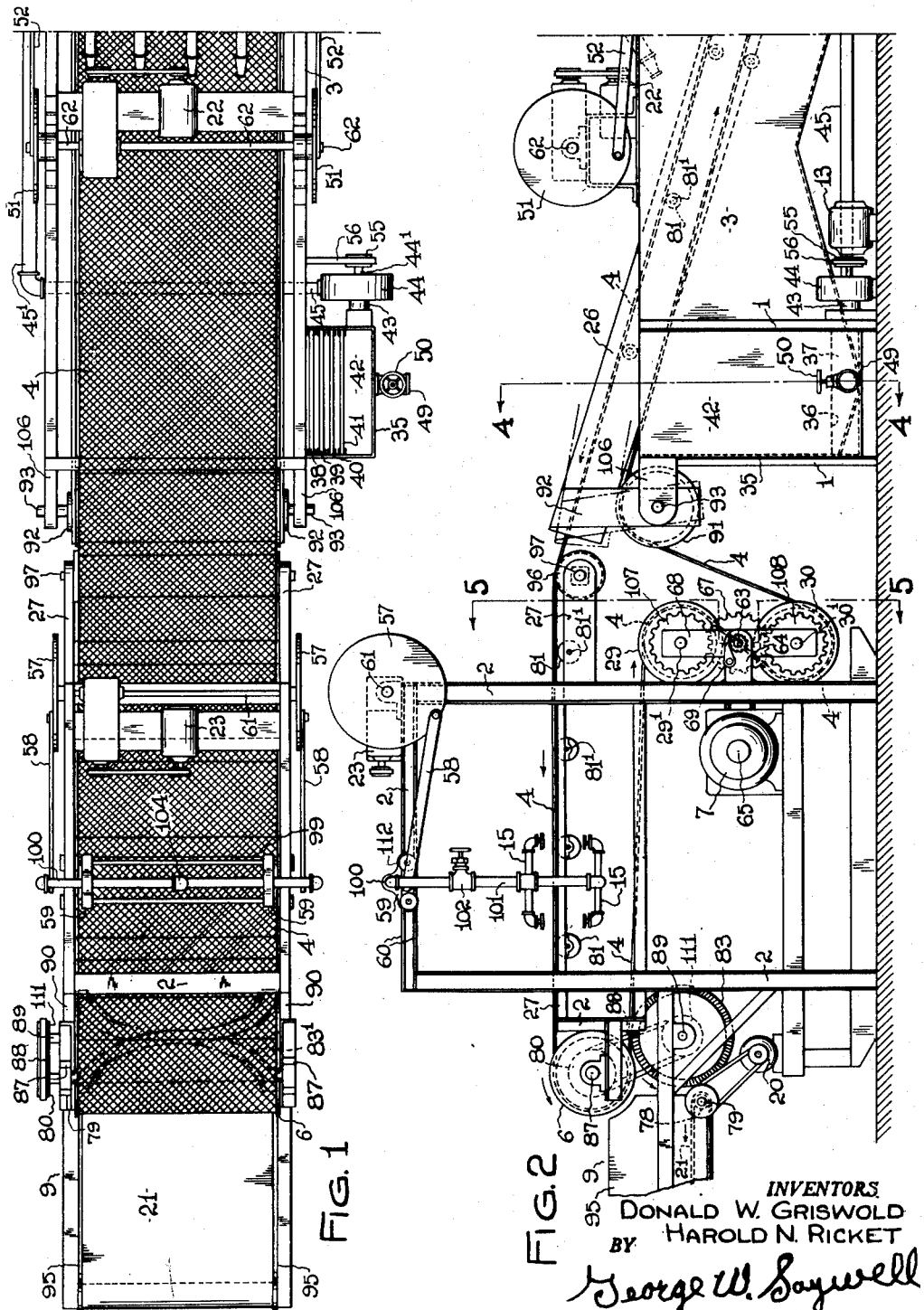

INVENTORS.
DONALD W. GRISWOLD
BY HAROLD N. RICKET
George W. Saywell
ATTORNEY

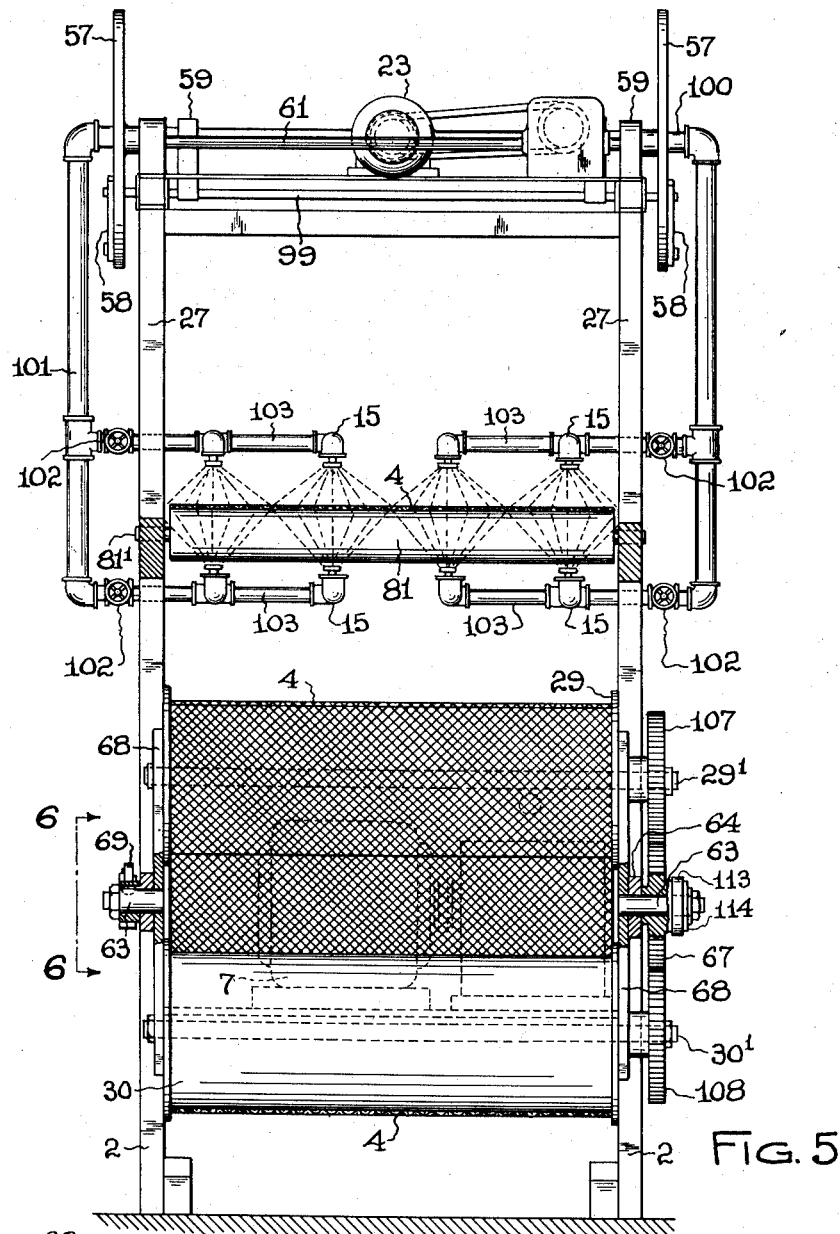

Patented Jan. 1, 1952

2,580,420

UNITED STATES PATENT OFFICE 2,580,420

APPARATUS FOR PROCESSING FOOD STOCK

Donald W. Griswold, Oberlin, and Harold N. Ricket, Amherst, Ohio, assignors to The American Specialty Company, Amherst, Ohio, a corporation of Ohio Application May 3, 1947, Serial No. 745,882

3 Claims. (Cl. 134—73)

The invention relates to apparatus for processing food stock, and particularly to apparatus for processing fresh perishable food stock, such as vegetables. The invention is particularly serviceable for washing fresh vegetables. For most fresh vegetable food stock, the invention also serves efficiently as a precooling or chilling operation, and, also, in many instances for decontaminating of dirty, infested, diseased or contaminated food stock. The invention involves apparatus for the continuous processing of food stock, and, preferably, an individual processing thereof. By this it is meant that the apparatus processes a great quantity of food stock pieces, such as a large quantity of vegetables at one time by a continuous operation, but the stock pieces or vegetables are preferably not washed in bunched formation, but each vegetable, leaf, or piece receives its own individual treatment. The invention is suitable for processing fresh perishable food stock of many varieties, such as lettuce, beets, carrots, radishes, green onions, parsley, celery, sweet corn, cucumbers, endive, escarole, strawberries, apples, pears, tomatoes, pickles, etc. The apparatus processes the stock efficiently and without injury or blemish to the leaves, stems, or tissues. The processing is effected automatically, and without necessity of experienced operators, and at a high rate of production.

The annexed drawings and the following description set forth in detail certain means exemplifying the invention, such drawings and description disclosing, however, only one of the various forms of apparatus in which the principle of the invention may be embodied and only a few of the various series of steps by which the improved methods may be worked.

In said annexed drawings:

Figure 1 is a top plan showing about one-half the length of the apparatus, including the discharge or front end thereof;

Figure 1A is a top plan of the remainder of the apparatus, including the receiving or rear end, Figures 1 and 1A combined being a top plan of the complete apparatus;

Figure 1B is a fragmentary side elevation of one of a plurality of certain water-agitating spray nozzles;

Figures 2 and 2A are side elevations of the parts of the apparatus respectively shown in Figures 1 and 1A;

Figure 5 is a transverse vertical section, upon a still greater enlarged scale, taken in the planes indicated by the line 5—5, Figure 2; and Figure 6 is a side view of a detail, taken from the plane indicated by the line 6—6, Figure 5.

Figure 3:
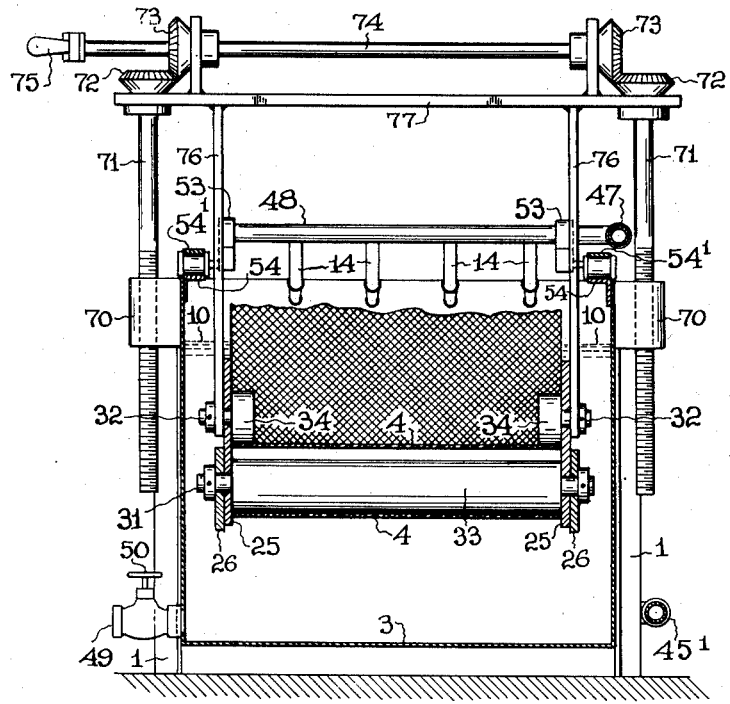
Figure 3 is a transverse vertical section, upon an enlarged scale, taken in the plane indicated by the line 3—3, Figure 2A.

Referring to the annexed drawings in which the same parts are indicated by the same respective numbers in the several views, a main frame 1 of skeleton formation, and extending from the feed or rear end of the apparatus forwardly for about two-thirds the length of the apparatus, is provided for the support and accommodation of a water tank 3, and a second smaller frame 2 of skeleton formation, and located rearwardly adjacent of the discharge or front end of the apparatus, provides a support for certain actuating elements, and certain final-spraying elements 15.

During the washing operation the stock is conveyed through the tank 3 and the area covered by the sprayers 15 from a feed station 8 to a discharge station 9 by an endless foraminous conveyor 4, preferably formed from closely woven wire mesh, which is propelled from a motor 7, Figure 2, and passes over a rear end pulley 5 and a front end pulley 6.

The tank 3 is supplied with fresh or treated water from a controlled pipe 11, Figure 2A, and the water in the tank 3 is maintained at a level indicated by "10" through the medium of an overflow outlet 12 and drain 12¹. The water in the tank 3 is recirculated by a pump 44, Figure 2, and sediment is continuously or periodically drawn off from the bottom of the tank 3 through cocks 49 having valves 50, the tank 3 having a bottom of sawtooth formation and the cocks 49 being placed at the respective low points of the water tank bottom.

The processing procedure effected by the apparatus thus far described in general terms, which apparatus will be hereinafter described in detail, consists in feeding the vegetables at the machine end 8 by a belt 19 passing over a pulley 16 secured to a shaft 17 driven by a belt 24 from a motor 18. The belt 19 discharges the vegetables on to a fabric chute 82 spring wound on a roller 84 and held in an extended position by any suitable fastening means (not shown) at its bottom edge. The chute 82 delivers the vegetables on to the top run of the belt 4 adjacently forwardly of the pulley 5. The vegetables are conveyed by the belt 4 lengthwise of and in the tank 3 where they are subjected to any desired degree of turbulent water induced by a plurality of longitudinally reciprocated staggered series of spray nozzles 14 through which water at any desired pressure is supplied, the vegetables being turned, rolled and tumbled at a suitable violence in the tank 3 upon the top run of the belt 4 and in a selective depth of water above the belt. The belt 4 passes out of the front of the tank 3 and finally conveys the vegetables through the area of the skeleton frame 2 where they are given a final spray and rinse by the spray nozzles 15 and then discharged at the machine end 9 adjacently forwardly of the pulley 6 on to a conveyor 21 engaging a pulley 78 secured to a shaft 79. The conveyor 21 also serves as a means upon which so-called "dry" inspection and final trimming of the cleaned vegetables can be effected.

The various apparatus details for effecting the above procedure, and controlling the procedure, according to requirements and desired results, are as follows:

From the shaft of a motor 13 for actuating the water-recirculating pump 44, Figures 1 and 2, a belt 56 is driven, which belt 56 drives a pulley 55 secured to a shaft 44$^1$ intersecting the housing of the pump 44 and serving to drive vanes (not shown) to withdraw water through a pipe 43 from a chamber 42 in a tank portion 35 laterally extended from one side of, and communicating with, the front end of the main tank 3. The pump 44 is mounted at floor level and the withdrawn water passes therefrom through a pipe 45 extended transversely under the tank 3 and at its far end communicating with a rearwardly and longitudinally extended pipe section 45$^1$ which at its rear end, Figure 2A, communicates with an upwardly extended flexible conduit 46 having a control valve 46$^1$ adjacent its upper end and communicating at its top with a longitudinally extended header pipe 47 from which extend a plurality of spaced transverse pipes 48 having each a plurality of depending spray nozzles 14 directed downwardly and forwardly toward the surface of the water in the tank 3. The nozzles 14 are provided with means (not shown) for varying the orifice thereof and are adjustably mounted so that the angle of the water stream issuing therefrom can be selected as desired.

Figure 4:
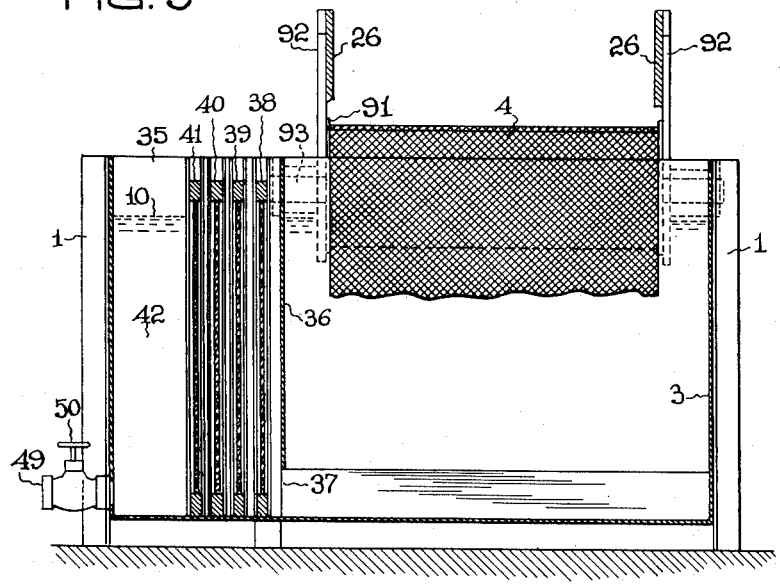
Figure 4 is a transverse vertical section, upon an enlarged scale, taken in the plane indicated by the line 4—4, Figure 2.

The laterally extended tank portion or compartment 35 is separated from the main tank portion 3 by a depending partition 36, Figures 2 and 4, which partition 36 stops short of the bottom of the tank 3 and thus provides an opening 37 through which water passes into the side tank 35. The water is screened as it passes from the main tank portion 3 to a free area 42 adjacent the outside portion of the tank portion 35 by a succession of longitudinally extending spaced screens 38, 39, 40, and 41, the meshes of which are progressively smaller so that pieces of sediment of progressively smaller size are strained out and drop to the inclined floor of the tank portion 35 whence they can be continuously or periodically removed through the cock 49.

Different kinds of vegetables, and oftentimes different types of soil, and different conditions of the same kind of vegetables, require different or varying washing treatments to effect a thorough cleansing. This particularly applies to the amount of washing, and the strength of water pressure, and the angle at which the sprays are applied for effecting suitable agitation and turbulence of the water in the tank 3, and to the character and pressure of the spraying within the small framework 2. A part of the necessary adjustable and varying control is effected by the water pressures utilized from the sprayers 14 and 15, and a part from the height of the conveyor 4 in the tank 3. The position of the conveyor 4 in the tank 3 is vertically adjustable to regulate the depth of water thereabove according to the characteristics of the stock to be processed and the particular processing which is desired. This adjustment is effected by making the guide parts of the frame upon which the belt 4 is mounted and through which it passes of a plurality of sections, three, in the form of apparatus shown, a rear section 25 which is vertically adjustable as a whole, a front section 27 which is fixed, and an intermediate section 26 which is pivoted at its two ends relative to the respective sections 25 and 27. The sections 25, 26, and 27 are elongated frame members each having two opposed side members, of which the side members 27 are secured to and adjacently inwardly of the side members of the skeleton framework 2, the side members 25 are secured to the inside faces of the bottom of members 76, Figure 3, depending from elevated cross members 77, and the intermediate members 26 are pivotally secured at one end to the outside faces of the lower ends of the members 25 and secured at the other end, somewhat rearwardly of the section 27, to the upper ends of the inside faces of brackets 92 erected on and pivotally connected to a shaft 93 mounted in ears 106 forwardly extended from the front end of the frame-work 1.

The means herein shown for purposes of illustration for vertically adjusting this articulated frame structure is as follows:

The elevated cross frame members 77 from which the members 76 depend are supported on opposed pairs of elongated depending rods 71, Figures 2A and 3, which are exteriorly threaded for a substantial part of their length and engage internally threaded tubular blocks 70 outwardly extended from the tank 3 upon opposite sides of the skeleton frame-work 1 and adjacent the top of the latter, which rods 71 at their upper ends are secured within beveled gears 72 engaging beveled gears 73 secured to cross shafts 74 provided at one end with a crank arm 75 and mounted upon the cross members 77. This mechanism for vertical adjustment is provided at both ends of the frame-work 25. It will thus be seen that actuation of the crank arms 75 will result in lifting or lowering the frame-work 25, and one end of the frame-work 26 to affect the depth in the tank 3 at which the conveyor 4 runs and thus control the depth of water in which the vegetables are immersed and tumbled about.

In addition to the end pulleys 5 and 6 over which the conveyor 4 travels, and two lower run drive pulleys 29 and 30, Figure 2, secured to power shafts 29$^1$ and 30$^1$ driven by the motor 7, it engages vertically superimposed rollers 34 and 33, Figures 2A and 3, mounted between the frame-work members 25 and on shafts 32 and 31 respectively mounted in the bottom ends of the depending members 76 and in the frame-work 25 and the frame-work 26, Figure 3, the shafts 31 and 32 serving respectively to pivotally secure the frame-work 25 to the frame-work 26, and to secure the frame-work 25 to the depending members 76. Also, the upper run of the conveyor 4 engages a roller 96 mounted on a shaft 97 supported at the rear end of the side frame members 27. Furthermore, the conveyor 4 throughout its length runs over spaced rollers 81 mounted on transverse shafts 81$^1$ mounted on the frame-works 25, 26, and 27, which rollers 81 are provided for both runs of the conveyor 4.

The raising and lowering of the conveyor 4 on pivotally connected supports requires adjustment of the conveyor 4 as to looseness or tightness, and this is effected by mounting the drive pulleys 29 and 30, Figures 2 and 5, at the respective upper and lower ends of vertically extending opposed side members 68 which are pivotally mounted intermediate their lengths upon trunnions 63 mounted in brackets 64 rearwardly extended from the frame-work 2. Thus the pulleys 29 and 30 can be moved around the axis of the trunnions 63 as a center and one of the pulleys moved forwardly and the other rearwardly and thus effect a take-up or a loosening of the conveyor 4. The power shafts 29¹ and 30¹ to which the pulleys 29 and 30 are respectively secured are provided with gears 107 and 108 respectively, both of which engage an intermediate gear 67 driven from the shaft 65 of the motor 7 and mounted on one of the trunnions 63. The opposite trunnion 63 is provided with a pawl and ratchet assembly 69, of which the pawl is secured to a bracket 64, whereby the position of the pulleys 29 and 30 for proper conveyor tightening can be suitably maintained. The intermediate gear 67 is actuated from the shaft 65 of the motor 7 by a belt 113 and a pulley 114, Figure 5, and a pulley (not shown) actuated by the shaft 65. The lower run of the conveyor 4 passes on to the top of the drive pulley 29 from front to rear, and thence downwardly and forwardly to the top of and around the drive pulley 30 from rear to front and thence passes upwardly and rearwardly to the top of the large pulley 91.

For a final cleaning of the vegetables by means of the spray nozzles 15 in the frame 2, fresh, chilled, or treated water is supplied through a top valved inlet 104 and flows in a header pipe 100 in both directions transversely across the top of the frame 2, thence downwardly through the vertical conduits 101 on the two sides of the frame 2, which conduits 101 communicate with inwardly extending transverse conduits 103, two of the latter being superimposed on each side, and provided with adjustable spray nozzles 15, so that the spray from the latter can be directed against both the top and bottom surfaces of the vegetables traveling on the conveyor 4 through the frame 2 between the opposed series of sprayers 15. The pipes 103 are provided with valves 102 whereby the amount of water can be controlled, both that which impinges upon the top of the vegetables and that which impinges upon the bottom thereof. The last-mentioned impinging water reaches the vegetables through the mesh of the conveyor 4 and so is broken up and does not impinge upon the vegetables with the same force as the water sprayed from the top and, therefore, does not require such precautions to prevent injury to the leaves and tissues of some vegetables as is required in controlling the water from the top sprayers 15 which impinge directly upon the vegetables.

Both the spray nozzles 14 and 15 can be reciprocated longitudinally of the apparatus so as to impinge upon all sections of the water surface in the tank 3 and, also, to effect repeated spraying of the same vegetables by the same sprays as the vegetables pass through the frame 2. This latter result is effected by giving the spray nozzles 15 a faster speed of travel than the travel of the conveyor 4.

The reciprocation of the spray nozzles 14, herein shown for purposes of illustration, is effected by a pair of discs 51, Figures 1 and 2, secured to a cross shaft 62 and rotated from a motor 22. Pivotally secured by one end to and adjacent the periphery of the discs 51 are a respective pair of links 52 whose other ends are pivotally mounted on a cross rod 109, Figures 1A and 2A. Carriages 53 have wheels 110 which run on rails 54 mounted on top of the frame-work 1, the cross rod 109 intersecting the carriage bodies 53. The wheels 110 are restrained from raising by top rails 54¹. In one carriage 53 is mounted an end of the rear cross pipe 48 having depending therefrom four of the sprayers 14. The other end of this cross pipe 48 passes through the opposed carriage 53 and communicates with the header pipe 47. As hereinbefore described, there are a plurality of spaced cross pipes 48, and each one is mounted in corresponding carriage bodies 53 and can be reciprocated on the rails 54, all of the conduits 48 being reciprocated simultaneously inasmuch as the several carriage bodies 53 on one side of the apparatus are connected by the longitudinally extending header pipe 47.

The means for reciprocating the final cleaning sprayers 15 is shown as consisting also of a pair of discs 57 rotatably mounted upon a cross shaft 61 mounted on top of the skeleton frame 2, these discs 57 being rotated from a motor 23 and being pivotally secured to eccentrically located links 58 at one end of the latter, the opposite end of the links 58 being pivotally secured to a cross rod 99 intersecting opposed carriages 59. The carriages 59 are intersected by the conduit 100 and carry the latter. The carriage bodies 59 are provided with wheels 112 that roll upon and between opposed longitudinal upper side members or tracks 60 of the skeleton frame 2.

A brush 83 is provided adjacently rearwardly of and below the discharge roll 6 and adjacently below the lower run of the conveyor 4 for the purpose of gently removing from the mesh of the conveyor 4 any adhering pieces of the vegetables which may have become entwined therein and for charging them on to the discharge belt 21. This procedure represents a considerable saving of valuable material when washing individual pieces such as spinach. This brush 83 has a pair of spherically wound peripheral brushing members 83¹. The brush 83 is secured to a shaft 89 and moves in the direction indicated by the arrow in Figure 2 and gently rolls the pieces out of or off from the conveyor mesh as the brush passes under the conveyor 4. The rotation of the brush 83 in the direction indicated is effected from the shaft 87 of the front pulley 6 by means of a chain 88 which engages a sprocket 80 secured to the shaft 87 and also engages a sprocket 111 secured to the shaft 89, which shaft 89 is mounted in a pair of brackets 90 supported by and forwardly extended from the skeleton frame 2.

The discharge belt 21 is sprocket driven from its own individual motor 20.

A pair of opposed longitudinally extending side guards 94 are provided at the loading end 8 of the apparatus and a corresponding pair of side guards 95 at the discharge end 9.

The described structure of a fresh perishable food stock washer lends itself to quite universal application. The conveyor-driving motor 7 has a 4-speed transmission so that the rate of travel of the conveyor 4 can be widely varied according to the requirements of the particular foods being processed. The conveyor 4 can be supported at different water depths in the tank 3 so as to agitate, roll, and tumble the stock according to its own particular requirements, and the amount of water agitation can be controlled by the pressure of the water fed through the adjustable nozzles 14. The latter are forwardly and angularly directed in order to assist in the flow of the water from the rear toward the front end of the tank 3. The reciprocation of the nozzles 14 and 15 is effected by their own individual actuating means and can be eliminated if the particular stock being treated does not require the water agitation and spraying effected by reciprocating nozzles.

The flavor, turgidity and other characteristics of many foods are materially enhanced by the prompt chilling or precooling thereof. This is particularly true of such perishable foods as sweet corn, green peas, and endive. The improved apparatus described herein serves efficiently for any such precooling operation. During such use of the apparatus, the conveyor 4 is operated at a comparatively slow speed and the operation consists essentially in a cooling of the food pieces by an immersion in, and a slow passage thereof, through the tank 3. In this case, agitation of the water might not be required nor a spraying by the nozzles 15, in which event the motors 22 and 23 are shut off, and the motor 7 run at its low speed.

What we claim is:

1. Apparatus for processing food stock comprising a frame, a water tank mounted therein, a pump and conduits recirculating water through the tank including nozzles discharging into the tank, means for maintaining a water level in the tank, tank sediment drainage means, an endless conveyor and means for moving the same through the tank and in an area exteriorly of the tank, conveyor rollers, and a guiding support for the conveyor over which the latter travels, said support having a vertically-movable tank section, at least one fixed section exteriorly of the tank, and a section intermediate the aforementioned sections, pivotally secured to the tank section, and extending from the tank and exteriorly thereof to a position adjacent the fixed section, means for vertically adjusting the tank section of the conveyor support to vary the depth at which the stock carried by the conveyor is conveyed through the tank, conveying means receiving the processed stock from the conveyor, and means for tensioning the conveyor in accordance with the disposition thereof occasioned by the adjustment of the conveyor support.

2. Apparatus for processing food stock comprising a frame, a water tank mounted therein, a pump and conduits recirculating water through the tank including adjustable nozzles discharging into the tank in the direction of water movement therethrough, means for maintaining a water level in the tank, tank sediment drainage means, an endless conveyor and means for moving the same through the tank and in an area exteriorly of the tank, conveyor rollers, and a guiding support for the conveyor over which the latter travels, said support having a vertically-movable tank section, at least one fixed section exteriorly of the tank, and a section intermediate the aforementioned sections, pivotally secured to the tank section, and extending from the tank and exteriorly thereof to a position adjacent the fixed section, means for vertically adjusting the tank section of the conveyor support to vary the depth at which the stock carried by the conveyor is conveyed through the tank, means for spraying the stock exteriorly of the tank, means for reciprocating the last-mentioned spraying means longitudinally of the stock run and at a speed greater than the stock run, conveying means receiving the processed stock from the conveyor, and means for tensioning the conveyor in accordance with the disposition thereof occasioned by the adjustment of the conveyor support.

3. Apparatus for processing food stock comprising a frame, a water tank mounted therein, a pump and conduits recirculating water through the tank including adjustable nozzles discharging into the tank in the direction of water movement therethrough, means for maintaining a water level in the tank, a plurality of adjacent screens of consecutively finer mesh for straining the water adjacently forwardly of the pump, tank sediment drainage means, an endless foraminous conveyor and means for moving the same through the tank and in an area exteriorly of the tank, conveyor rollers, and a guiding support for the conveyor over which the latter travels, said support having a vertically-movable tank section, at least one fixed section exteriorly of the tank, and a section intermediate the aforementioned sections, pivotally secured to the tank section, and extending in an upwardly inclined direction from the tank and exteriorly thereof to a position adjacent the fixed section, means for vertically adjusting the tank section of the conveyor support to vary the depth at which the stock carried by the conveyor is conveyed through the tank, means for reciprocating the nozzles longitudinally of the tank, means for spraying the stock exteriorly of the tank upon both the upper and lower faces of the conveyor run carrying the stock, means for reciprocating the last-mentioned spraying means longitudinally of the stock run and at a speed greater than the stock run, conveying means receiving the processed stock from the conveyor, and means for tensioning the conveyor in accordance with the disposition thereof occasioned by the adjustment of the conveyor support.

DONALD W. GRISWOLD.
HAROLD N. RICKET.

REFERENCES CITED

The following references are of record in the file of this patent:

UNITED STATES PATENTS

| Number | Name | Date |
|---|---|---|
| 453,130 | Ritscher | May 26, 1891 |
| 935,201 | Hallauer | Sept. 28, 1909 |
| 952,734 | Haller | Mar. 22, 1910 |
| 1,197,831 | Knapp et al. | Sept. 12, 1916 |
| 1,215,596 | Wescott | Feb. 13, 1917 |
| 1,224,384 | Kaukaine | May 1, 1917 |
| 1,294,335 | Fluharty | Feb. 11, 1919 |
| 1,377,906 | Mason | May 10, 1921 |
| 1,390,268 | Beckett | Sept. 13, 1921 |
| 1,392,546 | Williamson | Oct. 4, 1921 |
| 1,457,218 | Du Pont et al. | May 29, 1923 |
| 1,464,775 | Reuter | Aug. 14, 1923 |
| 1,511,060 | Miller | Oct. 7, 1924 |
| 1,576,930 | Perry | Mar. 16, 1926 |
| 1,676,714 | Smallidge | July 10, 1928 |
| 1,757,103 | Voigt | May 6, 1930 |
| 1,772,669 | Lane | Aug. 12, 1930 |
| 1,899,657 | Zademach | Feb. 28, 1933 |
| 2,057,982 | Secundo | Oct. 20, 1936 |
| 2,249,792 | Skinner | July 22, 1941 |
| 2,289,851 | Maxey | July 14, 1942 |
| 2,331,164 | Berger et al. | Oct. 5, 1943 |
| 2,397,957 | Gephart | Apr. 9, 1946 |
| 2,421,425 | Leszkowicz | June 3, 1947 |